UNITED STATES PATENT OFFICE.

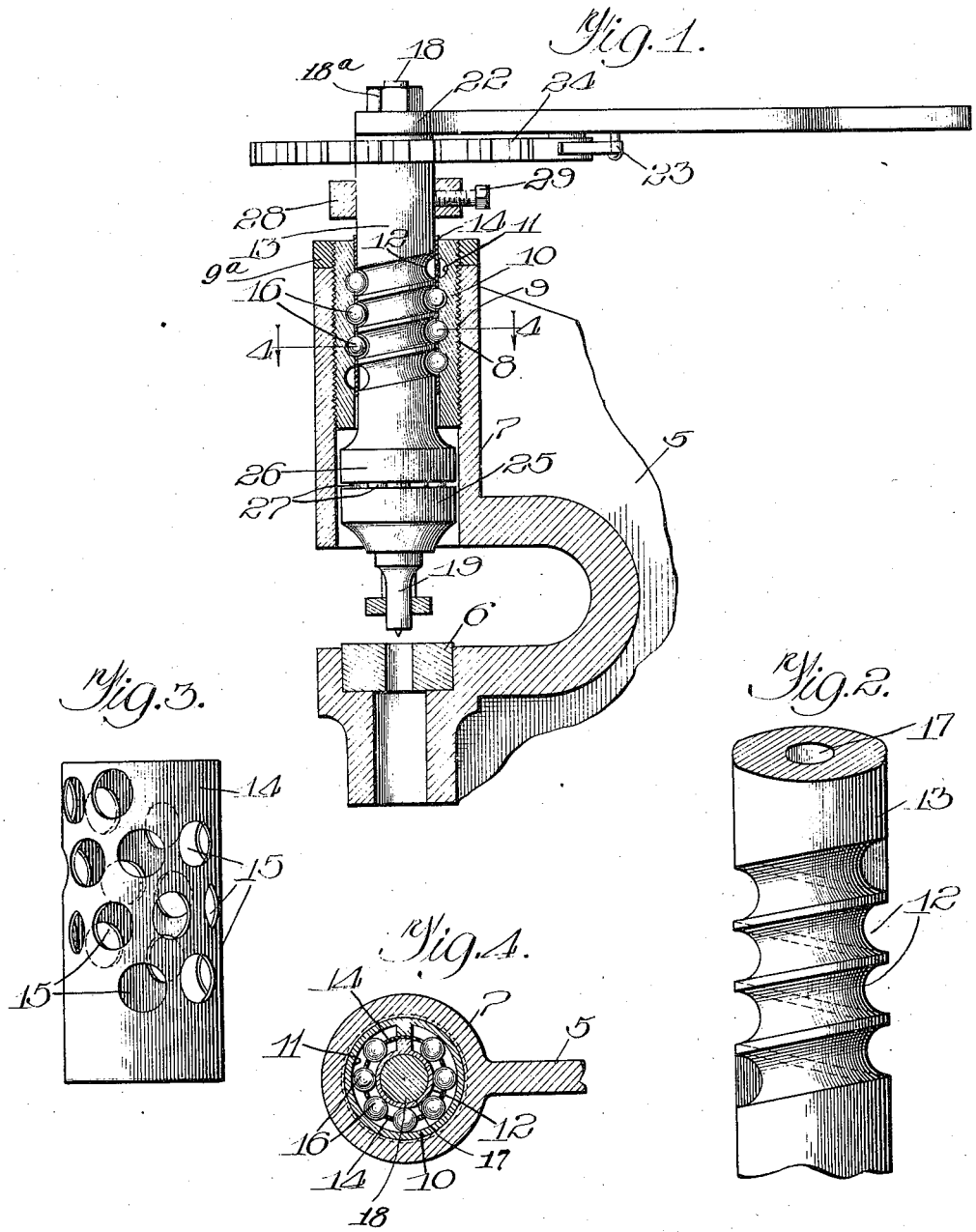

WILLIAM A. WHITNEY, OF ROCKFORD, ILLINOIS.

MECHANICAL MOVEMENT.

975,591.

Specification of Letters Patent. Patented Nov. 15, 1910.

Application filed July 30, 1908. Serial No. 446,054.

*To all whom it may concern:*

Be it known that I, WILLIAM A. WHITNEY, a citizen of the United States, residing at Rockford, in the county of Winnebago and State of Illinois, have invented certain new and useful Improvements in Mechanical Movements, of which the following is a specification.

The object of the invention is to provide improved means for converting a rotary motion into a reciprocatory motion.

The invention is herein shown as applied to a punch, but it is obvious that it may be used in connection with various other devices wherein a rotary motion is to be converted into a reciprocatory one.

In the drawings, Figure 1 is a vertical longitudinal sectional view through a punch stock to which my invention is applied. Fig. 2 is an elevation of the actuating sleeve carried by the stock. Fig. 3 is an elevation of a ball spacer, and Fig. 4 is a transverse sectional view on the line 4—4 of Fig. 1.

5 indicates a die stock having the usual die 6.

7 is a cylindrical barrel having interior threads 8 to receive the exterior threads 9 of a bushing 10. The bushing 10 is rigidly secured in place by a lock nut $9^a$, and virtually forms a part of the barrel 7. The bushing 10 is in the form of an elongated cylinder provided on its interior with a spiral groove 11 corresponding to the groove 12 in a spindle 13, which spindle is slidable and rotatable in the bushing 10. Interposed between the spindle 13 and the bushing 10 is a cylindrical ball spacer 14 having openings 15 arranged in a spiral series to space the balls 16. The spacer 14 is rotatable and longitudinally movable with relation to both the bushing and the spindle. The balls 16 lie within the grooves 12 in the spindle 13 and the grooves 11 in the bushing 10, and constitute a screw-thread on the bushing engaging the screw-thread 12 in the spindle. The spacer 14 serves to hold the series of balls together so that the series reciprocates and rotates bodily or as a unit. To the spindle 13 is suitably connected a punch 19. In order that the punch shall not rotate with the screw spindle 13, the connection between said parts is made in the following manner: The spindle 13 is provided with a central opening 17, through which projects loosely a stem 18 carrying the punch 19. On said stem 18 is a shoulder forming a ball cup 25 corresponding with a ball cup 26 formed on the lower end of the spindle 13. The pressure of the spindle 13 is transmitted to the punch 19 through antifriction balls 27 interposed between the cups 25 and 26. A nut $18^a$ on the upper end of the stem 18 overlying the upper end of the spindle 13 holds said stem against longitudinal movement with relation to the spindle.

The means herein shown for rotating the spindle 13 to raise and lower the punch 19 comprises a hand lever 22 having a pawl 23, which engages a ratchet wheel 24 fixed on the spindle 13. By operating the lever 22, causing the pawl 23 to engage the ratchet wheel 24, a rotary movement is imparted to the spindle 13, said spindle moving downward upon the screw thread formed by the spiral series of balls 16. The spindle 13 does not slide upon the ball-thread 16, but, on the contrary, the balls composing said thread roll in the grooves 11 and 12 and travel downward when the spindle descends, and travel upward when said spindle moves upward. It will thus be seen that friction is reduced to a minimum, and that substantially all the power applied to the spindle is transmitted to the punch 19. The downward movement of the spindle 13 is limited by the collar 28 carried on said spindle and fastened by the set screw 29 (see Fig. 1).

The entire mechanism may be removed from the punch stock by removing the bushing 10.

I claim as my invention:

1. A mechanical movement comprising a spirally grooved spindle, a spirally grooved casing containing said spindle, a series of balls lying in said grooves and free to travel along said grooves, the length of said series being less than the length of said grooves, and means to hold the series of balls together so that the series may reciprocate along and rotate around the spindle as a unit.

2. A mechanical movement comprising a spirally grooved spindle, a spirally grooved casing containing said spindle, a cylinder rotatably surrounding said spindle within said casing and movable longitudinally of said casing and said spindle, said cylinder having a spiral series of openings formed therethrough, and balls in said openings lying in the grooves of said spindle and said casing, the length of the series of balls being less than the length of the grooves, said cylinder serving to hold the series of balls together so that the series may reciprocate along and rotate around the spindle as a unit.

WILLIAM A. WHITNEY.

Witnesses:
N. P. NELSON,
HENRY REYNOLDS.